United States Patent [19]

Snuttjer et al.

[11] Patent Number: 4,959,569
[45] Date of Patent: Sep. 25, 1990

[54] STATOR COIL WATER SYSTEM EARLY ALERT HYDROGEN LEAKAGE MONITOR

[75] Inventors: Owen R. Snuttjer, Oviedo; Michael J. Rasinski, Winter Springs, both of Fla.

[73] Assignee: Westinghouse Electric Corp., Pittsburgh, Pa.

[21] Appl. No.: 441,135

[22] Filed: Nov. 22, 1989

[51] Int. Cl.⁵ .................... H02K 9/00; H02K 9/24; G01M 3/08; F28F 00/00
[52] U.S. Cl. .................... 310/53; 310/52; 310/54; 310/55; 165/11.1; 73/40.5 R
[58] Field of Search .................... 310/52, 53, 54, 55, 310/58, 59; 165/11.1, 32, 70; 73/40.5; 55/274, 309

[56] References Cited

U.S. PATENT DOCUMENTS

| | | | |
|---|---|---|---|
| 2,675,493 | 4/1954 | Grobel | 310/53 |
| 3,122,668 | 2/1964 | Cuny | 310/53 |
| 4,008,755 | 2/1977 | Vandamme | 310/53 |
| 4,373,379 | 2/1983 | Obara et al. | 73/40.5 R |
| 4,440,017 | 4/1984 | Barton et al. | 73/40.5 R |
| 4,590,793 | 5/1986 | Staats, Jr. | 73/40.5 R |
| 4,753,284 | 6/1988 | Krause et al. | 165/11.1 |
| 4,870,393 | 9/1989 | Snuttjer et al. | 165/11.1 |

FOREIGN PATENT DOCUMENTS 0110460 9/1981 Japan .................... 310/53

Primary Examiner—Steven L. Stephan
Assistant Examiner—C. LaBalle
Attorney, Agent, or Firm—Michael G. Panian

[57] ABSTRACT

An apparatus for monitoring hydrogen leakage from a generator frame into the stator coil water cooling system. The monitor is designed to alert the operator should leakage exceed a rate of twenty cubic feet per day (20 cfd). A pressure relief valve set at four (4) psig and orifice are provided, along with a second relief valve having a higher setpoint than the first, such that pressure will increase in the holding tank if leakage exceeds 20 cfd setpoint of the orifice. A high pressure alarm, set at a level higher than the first relief valve but less than that of the second, will then sound to alert the operator to protect the system from an overly large or gross failure of the system. By continousouly monitoring a relatively small steady state leakage rate, the operator can be aware of a minor problem which can be corrected at a scheduled maintenance outage, before a gross failure of the system, requiring a costly shutdown of the turbine-generator, would otherwise occur.

22 Claims, 3 Drawing Sheets

FIG. I
PRIOR ART

STATOR COIL WATER SYSTEM EARLY ALERT HYDROGEN LEAKAGE MONITOR

TECHNICAL FIELD

The invention relates to a dynamoelectric machine having a bifurcated cooling system, and more particularly to a stator coil water system having an early alert hydrogen leakage monitor.

BACKGROUND OF THE INVENTION

Large dynamoelectric machines, such as electric generators, typically utilize a bifurcated cooling system. The interior of the machine is generally cooled by circulation of a pressurized gas coolant within the airtight housing of the machine. Typically, the gas coolant is hydrogen. Other parts of the machine, such as the stator coils, are cooled by the circulation of a liquid coolant, such as water, therethrough. Generally the gas coolant within the frame of the machine is maintained at a higher pressure than that of the liquid coolant used for cooling the stator windings. Typically, the maximum operating pressure of the stator coil water system in the stator coils is about 30 psig, while the turbine generator frame is pressurized to 75 psig with the hydrogen blanket. Therefore, if a leak develops in the stator coil water system within the generator frame, hydrogen gas will leak into the stator coil water system.

Such a situation is to be avoided due to the fact that this in-leakage can tend to decrease the capability of the stator coil water system to function. The largest impact on a stator coil hot spot temperature may result in the case where gas leaks into a stator coil strand at or close to the inlet end (cold) of the coil. Should the leakage rate become sufficiently large, the hydrogen flow in the strand can be in both the upstream and downstream directions, effectively blocking cooling water flow in that strand. Should hydrogen flow back towards the inlet header and enter an adjacent coil strand, the electrical current carrying capacity of the coil may be further reduced. It is therefore important that the hydrogen leakage rate be monitored effectively so that any leaks can be fixed during a normal maintenance outage before significant problems develop.

Due to the pressure gradient of the hydrogen gas being at a higher pressure than the liquid coolant, any leakage is typically detected by the increase in the presence of gas entrained in the liquid coolant system, such as by gas monitor and warning system. The liquid coolant usually flows by means of Teflon ® water hoses located within the generator. Because of this a steady gas leakage rate of up to five cubic feet per day (5 cfd) can be expected in the stator coil water system. Thus, such a monitoring system should compensate for this normal presence of hydrogen gas within the coolant water system. When hydrogen gas leaks into the stator coil water system, it will accumulate in a water storage tank which is part of the stator coil water system assembly. By monitoring the pressure within this holding tank, the leakage rate of hydrogen gas into the stator coil water system can be determined.

Generally, conventional leakage monitors are designed to notify an operator should a gross failure of the water coolant system occur. Thus, this type of system is capable of passing large amounts of hydrogen (on the order of 400 cubic feet per day) before the operator is alarmed to the condition. Small leakage rates per day, which may eventually lead to a gross failure of the system later, can only be detected through close monitoring of a gas meter installed as part of the venting system for the holding tank. Although it is recommended that this gas meter be read and recorded weekly, the meter may be located in a remote spot not readily susceptible to periodic monitoring. Thus, small problems may not be detected before a gross failure can occur. Further difficulty arises in that, although the leak may be at a small but steady rate, it may accumulate in the water tank until it is discharged by a relief valve in large bursts. This can make the task of determining the leakage rate even more difficult. It is therefore desirable to design a system which will more timely alert the operator with an alarm when the hydrogen gas leakage rate exceeds a smaller rate. Such a system should also be capable of being easily retro-fitted, and assist the operator in determining the steady state leakage rate. Such a continuous monitoring system would allow relatively small problems to be monitored more closely so that they can be discovered early on and remedied at a scheduled maintenance outage before any gross failures of the system can occur.

DISCLOSURE OF THE INVENTION

It is therefore an object of the present invention to provide a stator coil water system leakage monitor which is capable of alerting an operator to relatively small leakages within the system.

It is another object of the present invention to provide a system which can be easily retro-fitted onto conventional stator coil water system leakage monitors so as to reduce its cost.

The above objects are attained by the present invention, according to which, briefly stated, a dynamoelectric machine includes a winding, a gas-tight housing surrounding the winding, a gas coolant circulating through the housing, and means for circulating a liquid coolant through the winding, the liquid circulating means including a holding tank for the liquid coolant. The liquid coolant is pressurized at a first predetermined level by the introduction of a second gas within the holding tank, and the gas coolant is maintained at a pressure higher than that of a liquid coolant. A means for detecting leakage of the gas coolant into the circulating liquid coolant comprises a first pressure relief valve in fluid communication with the holding tank and set at a second predetermined level which is greater than the first. An orifice is placed in fluid communication with the first relief valve on an end opposite that of the holding tank. The orifice includes an opening therein sized so as to release a specified volume of gas from the holding tank when the pressure therein is at least as great as that of the second predetermined level. A second pressure relief valve is also placed in fluid communication with the holding tank and set at a third predetermined level greater than the second predetermined level of the first pressure relief valve. A pressure switch is also included in fluid communication with the holding tank and set at a fourth predetermined level. The fourth predetermined level is greater than that of the second but less than the third predetermined level, such that the pressure switch is activated when the pressure within the holding tank is at least as great as the fourth predetermined level.

BRIEF DESCRIPTION OF THE DRAWINGS

Various other objects, features, and advantages of the invention will become more readily apparent by reading the following detailed description in conjunction with the drawings, which are shown by way of example only, wherein.

DESCRIPTION OF THE PREFERRED EMBODIMENT

Figure 1:
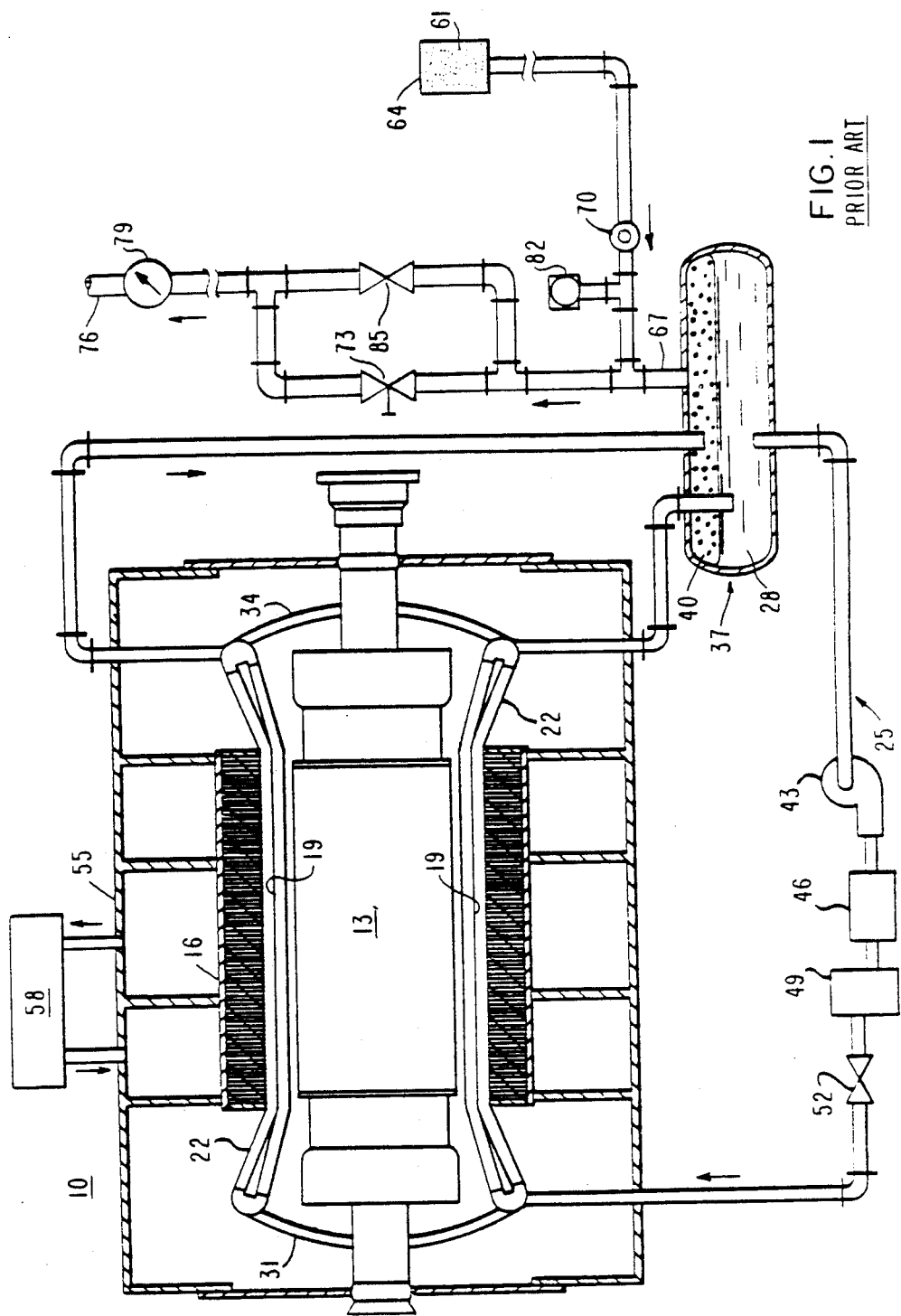
FIG. 1 shows a typical prior art hydrogen leakage monitor for a stator coil water cooling system.

Referring now to the drawings in detail, FIG. 1 shows a typical prior art arrangement for a dynamoelectric machine 10, such as a turbine-generator, having a bifurcated cooling system. The generator 10 includes a rotor 13 and a stator 16. The rotor 13 may be connected on one end to a turbine (not shown), and on the other end to an exciter (not shown). The stator 16 also includes one or more windings 19 within the stator 16. These windings 19 also including stator end turns 22.

The stator windings 19 are cooled by a stator coil cooling system 25 as shown in the figure. A liquid coolant 28, generally water, is introduced to the stator coil windings 19 through an inlet header 31 at one end of the stator 16 and flows through the stator windings 19 to exit therefrom at an outlet header 34. The water 28 then flows into a holding tank 37, wherein any gas 40 within the water 28 is separated out. Water 28 then flows from the holding tank 37 to, for example, a pump 43 and is typically passed through a heat exchanger 46 and one or more filters 49 or valves 52, before it is returned again to the inlet header 31. Additionally the generator 10, disposed within a gas-tight housing 55, is cooled by a gaseous coolant system 58, such as a hydrogen circulation system. The gas coolant 40 is circulated through the housing 55 to maintain the interior thereof and the generator 10 at an optimum operating temperature.

The water 28 within the stator coil water system holding tank 37 is maintained at a predetermined minimum pressure, on the order of about two (2) psig, by the introduction of a second gas 61 into the holding tank 37. Typically this gas is the same as that used in the gas coolant system, i.e., hydrogen. Hydrogen is fed from a pressurized hydrogen supply tank 64 into the holding tank 37 through an inlet pipe 67. A gas regulator 70 maintains the supply of hydrogen gas 40 supplied to the holding tank 37 at a pressure of about two (2) psig. Typically the pressure of the gas coolant system 58 is seventy-five (75) psig, such that should any failure occur within the stator coil water system 25, hydrogen gas 40 will flow into the stator coil water system 25.

In a typical prior art system, a pressure relief valve 73 is designed to operate should the pressure within the holding tank 37 reach about five (5) psig. Should a large enough leak occur, hydrogen gas 40 will be vented 76 to the atmosphere. A gas meter 79 located on the opposite end of the valves from the holding tank 37 can give a rough determination of the amount of hydrogen gas 40 that is vented out of the holding tank 37. A pressure switch 82 set at a six (6) psig level will activate an alarm to notify the operator that a failure of a system has occurred In case of a gross failure, a bypass valve 85 will be opened manually to vent any large accumulation of hydrogen gas 40 within the holding tank 37. However, this system can not alert an operator to small leaks which can eventually lead to gross failures of the system.

Figure 2:
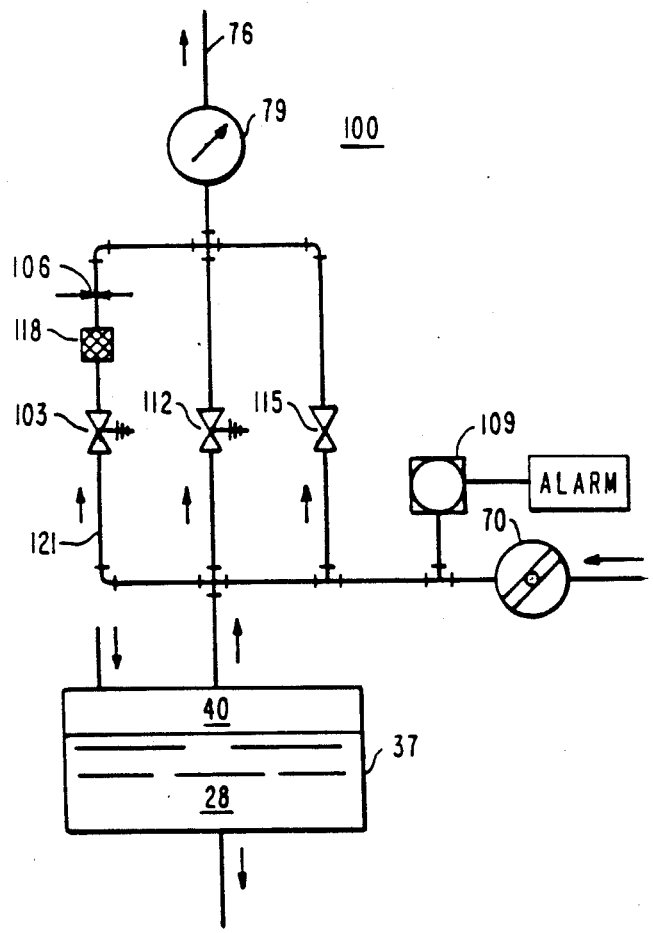
FIG. 2 shows one embodiment of the early alert hydrogen leakage monitor of the present invention.

A more sensitive system, such that a relatively small, steady state leakage of hydrogen gas 40 into the stator coil water system 25 can be detected early on, is shown in the early alert hydrogen leakage monitor 100 of the present invention in FIG. 2. A second pressure relief valve is also fluidly connected to the holding tank 37. The set points of the pressure relief valves are specifically selected such that a small, steady state leakage of hydrogen 40 into the stator coil water system 25 can be detected so that an operator can be alerted to a relatively minor situation before it results in a gross failure. Moreover, should a gross failure of the system suddenly occur, the early alert hydrogen leakage monitor 100 is capable of venting large volumes of hydrogen gas 40 quickly to prevent failure of other components, such as the holding tank 37.

The hydrogen leakage monitor 100 operates as follows: as hydrogen gas 40 accumulates in the water holding tank 37, it will be periodically discharged by a first pressure relief valve 103 as the pressure reaches a first predetermined level, which in the preferred embodiment is four (4) psig. As long as this leakage rate is below a predetermined volumetric rate, preferably twenty cubic feet per day (20 cfd), an orifice 106 having a specifically designed opening will be able to pass this rate, at a six (6) psig pressure drop, to maintain the pressure within the holding tank 37 below the level of six (6) psig. As long as the leakage rate is less than twenty (20) cfd, the orifice 106 will be able to pass this rate and the pressure will remain below six (6) psig. Should the leakage rate be greater than the twenty (20) cfd level, the orifice 106 will no longer be able to allow all of the gas 40 to pass through the first relief valve 103. Pressure within the tank 37 will thus continue to rise to above a fourth predetermined level, preferably set at about six (6) psig, activating a pressure switch 109 and setting off an alarm (not shown) to alert the operator that the leakage rate is now greater than twenty (20) cfd, so that the system can then be more closely monitored. Should the leakage into the stator coil water system 25 be even greater than the six (6) psig level, a second pressure relief valve 112 set at a higher, third predetermined level, such as eight (8) psig, will open to vent the system and protect the tank 37. A bypass valve 115 is also available to protect the system should a sudden gross failure occur. Preferably a filter 118 is placed in the fluid line between the first pressure relief valve 103 and the orifice 106, so as to prevent clogging of the orifice 106.

Figure 3:
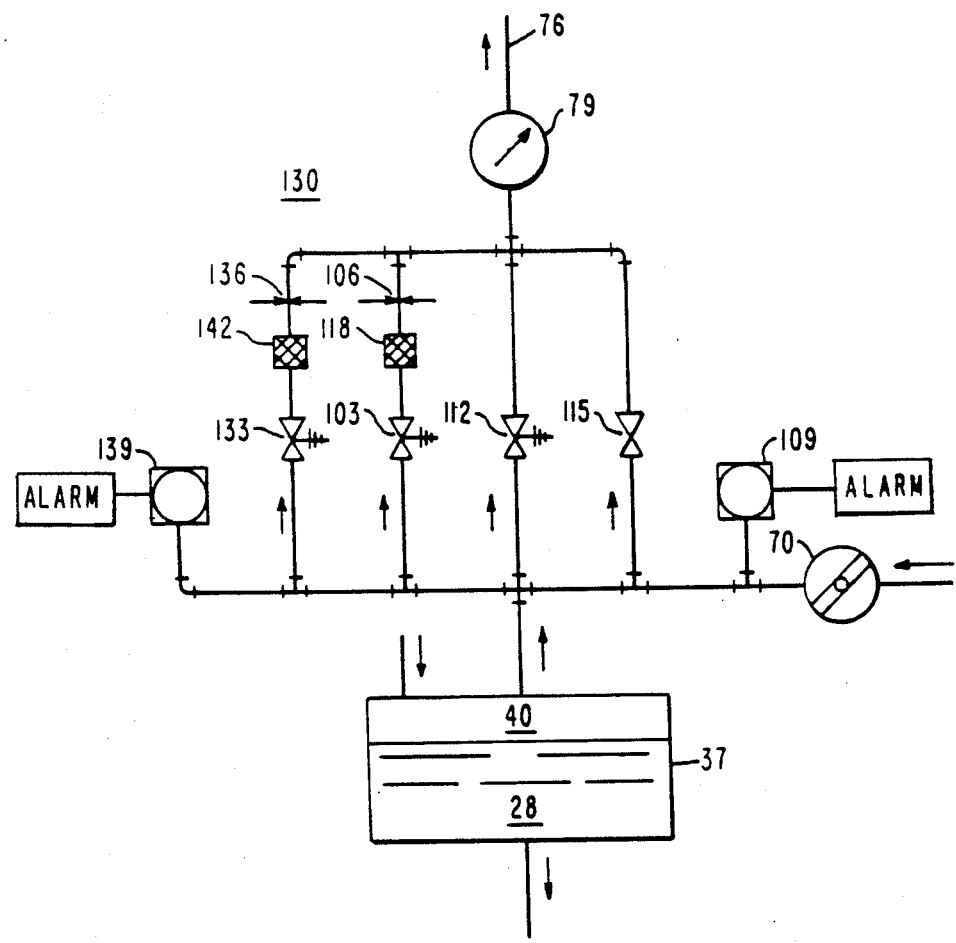
FIG. 3 shows a second embodiment of the early alert hydrogen leakage monitor.

If desired, additional flow rates can be alarmed with the installation of additional orifices, filters and relief valves in parallel with the first vent line 121. For example, in a second embodiment 130 of the invention shown in FIG. 3, at least a third pressure relief valve 133 set at the fourth predetermined level of six (6) psig, and having a second orifice 136 thereon sized to pass four hundred (400) cfd is installed. (This orifice 136 is sized assuming flow is also going through the first orifice 106.) In this system, the operator is immediately notified should the leakage rate exceed four hundred (400) cfd. Moreover, a second pressure switch 139, set at the third predetermined level of eight (8) psig, will alert the operator in this instance. Preferably, a second filter 142 is disposed between the third relief valve 133 and the second orifice 136. More direct monitoring of the system can then be undertaken, and repairs scheduled accordingly. Thus the early alert hydrogen leakage monitor 100,130 can be installed using a minimum of extra hardware which is easily retro-fitted to a stator coil water cooling system 25.

In the operation of a system, when the operator hears an alarm, he or she will then try to clear it. If the alarm condition will not clear, it is then indicated to the operator that the leakage rate is greater than the twenty (20) cfd setpoint. At this point, the gas meter 79 can be monitored much more closely to ensure that the leakage rate never exceeds four hundred (400) cfd. Also, anytime an alarm condition is indicated can be event logged, such as by a digital computer (not shown), so that the history of the system can be closely followed. Thus an operator can more closely monitor relatively minor leaks within the stator coil water system 25 before any gross failure of the system occurs. With such close monitoring and early notification of any minor leaks, the operator can schedule, at a regularly scheduled maintenance outing, the repair of the system. Thus large expense, such as having to bring the system off line to repair gross failures, can be eliminated.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limited as to the scope of the invention which is to be given the full breadth of the appended claims and in any and all equivalents thereof.

What is claimed is:

1. In a dynamoelectric machine having a winding, a gas-tight housing surrounding said winding, a gas coolant circulating through said housing, means for circulating a liquid coolant through said winding, said liquid circulating means including a holding tank for said liquid coolant, the liquid coolant being pressurized by the introduction of a second gas into the holding tank, the second gas being introduced at a first predetermined level and the gas coolant being maintained at a pressure higher than that of the liquid coolant, a means for detecting and monitoring leakage of said gas coolant into said circulating liquid coolant, said leakage detection monitor comprising:
    a first pressure relief valve in fluid communication with the holding tank and set at a second predetermined level which is greater than the first;
    an orifice in fluid communication with the first pressure relief valve on an end opposite that of the holding tank, said orifice having an opening therein sized so as to release a specified volume of gas from the holding tank when the pressure therein is at least as great as the second predetermined level;
    a second pressure relief valve in fluid communication with the holding tank and set at a third predetermined level greater than the second predetermined level; and
    a pressure switch in fluid communication with the holding tank and set at a fourth predetermined level, the fourth predetermined level being greater than the second but less than the third predetermined levels such that said pressure switch is activated when the pressure within the holding tank is at least as great as the fourth predetermined level.

2. The leakage detection monitor as recited in claim 1, further comprising a filter disposed between the first pressure relief valve and said orifice.

3. The leakage detection monitor as recited in claim 1, further comprising an alarm indicating means operably connected to said pressure switch so as to produce an alarm signal when said pressure switch is activated.

4. The leakage detection monitor as recited in claim 1, further comprising a bypass valve in fluid communication with the holding tank so as to vent large volumes of gas from the tank when the bypass valve is opened.

5. The leakage detection monitor as recited in claim 4, further comprising a gas meter in fluid communication with each of said first and second pressure relief valves and the bypass valve so as to give an indication of the volume of gas that is vented from the holding tank.

6. The leakage detection monitor as recited in claim 1, wherein the second predetermined level is approximately four (4) psig.

7. The leakage detection monitor as recited in claim 6, wherein the third predetermined level is approximately eight (8) psig, and the fourth predetermined level is approximately six (6) psig.

8. The leakage detection monitor as recited in claim 7, wherein said orifice has a capacity of about twenty cubic feet per day (20 cfd).

9. The leakage detection monitor as recited in claim 1, further comprising:
    a third pressure relief valve in fluid communication with the holding tank and set at the fourth predetermined level;
    a second orifice in fluid communication with the third pressure relief valve on an end opposite that of the holding tank, the second orifice having an opening therein sized so as to release a second specified volume of gas from the holding tank when the pressure therein is at least as great as the fourth predetermined level; and
    a second pressure switch in fluid communication with the holding tank and set at the third predetermined level, such that the second pressure switch is activated when the pressure within the holding tank is at least as great as the third predetermined level.

10. The leakage detection monitor as recited in claim 9, further comprising a second filter disposed between the second pressure relief valve and the second orifice.

11. The leakage detection monitor as recited in claim 9, further comprising a bypass valve in fluid communication with the holding tank so as to vent large volumes of gas from the tank when the bypass valve is opened.

12. The leakage detection monitor as recited in claim 11, further comprising a gas meter in fluid communication with each of said first, second and third pressure relief valves and the bypass valve so as to give an indication of the volume of gas that is vented from the holding tank.

13. The leakage detection monitor as recited in claim 9, wherein the second predetermined level is approximately four (4) psig.

14. The leakage detection monitor as recited in claim 13, wherein the third predetermined level is approximately eight (8) psig, and the fourth predetermined level is approximately six (6) psig.

15. The leakage detection monitor as recited in claim 14, wherein said orifice has a capacity of about twenty cubic feet per day (20 cfd).

16. The leakage detection monitor as recited in claim 15, wherein the second orifice has a capacity of about four hundred cubic feet per day (400 cfd).

17. The leakage detection monitor as recited in claim 9, further comprising a second alarm indicating means operably connected to the second pressure switch so as to produce a second alarm signal when the second pressure switch is activated.

18. The leakage detection monitor as recited in claim 1, wherein the gas coolant and said second gas are hydrogen.

19. A dynamo-electric machine comprising:
   a stator having a winding therein, the winding having coolant holes therethrough;
   a rotor centrally disposed within the stator;
   a gas-tight housing enclosing the stator and rotor;
   a gas cooling system for circulating a coolant gas within the housing, the gas coolant being maintained at a first predetermined pressure;
   a liquid cooling system for circulating a liquid coolant through said coolant holes of the winding, the liquid coolant system including a holding tank for collecting the liquid coolant therein, an inlet piping system for transporting the liquid coolant from the holding tank to the winding, an outlet piping system for removing the liquid coolant from the winding to the holding tank, pressuring system for pressuring the liquid system by introduction of a second gas into the holding tank at a first predetermined level, the liquid coolant thereby being maintained at a pressure which is less than that of the gas cooling system, and a leakage monitor for detecting leakage of said gas coolant into said liquid cooling system, said gas leakage detection monitor further comprising:
   a. a first pressure relief valve in fluid communication with the holding tank and set at a second predetermined level which is greater than the first;
   b. an orifice in fluid communication with the first pressure relief valve on an end opposite that of the holding tank, said orifice having an opening therein sized so as to release a specified volume of gas from the holding tank when the pressure therein is at least as great as the second predetermined level;
   c. a second pressure relief valve in fluid communication with the holding tank and set at a third predetermined level greater than the second predetermined level;
   d. a pressure switch in fluid communication with the holding tank and set at a fourth predetermined level, the fourth predetermined level being greater than the second but less than the third predetermined levels, such that said pressure switch is activated when the pressure within the holding tank is at least as great as the fourth predetermined level;
   e. alarm indicating means operably connected to said pressure switch so as to produce an alarm signal when said pressure switch is activated;
   f. a bypass valve in fluid communication with the holding tank so as to vent large volumes of gas from the tank when the bypass valve is opened; and
   g. a gas meter in fluid communication with each of said first and second pressure relief valves and the bypass valve so as to give an indication of the volume of gas that is vented from the holding tank.

20. The dynamo-electric machine as recited in claim 19, further comprising:
   a third pressure relief valve in fluid communication with the holding tank and set at the fourth predetermined level;
   a second orifice in fluid communication with the third pressure relief valve on an end opposite that of the holding tank, the second orifice having an opening therein sized so as to release a second specified volume of gas from the holding tank when the pressure therein is at least as great as the fourth predetermined level;
   a second pressure switch in fluid communication with the holding tank and set at the third predetermined level, such that the second pressure switch is activated when the pressure within the holding tank is at least as great as the third predetermined level; and
   second alarm indicating means operably connected to the second pressure switch so as to produce a second alarm signal when the second pressure switch is activated.

21. The dynamo-electric machine as recited in claim 20, wherein the second predetermined level is approximately four (4) psig, the third predetermined level is approximately eight (8) psig, the fourth predetermined level is approximately six (6) psig, said orifice has a capacity of about twenty cubic feet per day (20 cfd), and the second orifice has a capacity of about four hundred cubic feet per day (400 cfd).

22. The dynamo-electric machine as recited in claim 21, wherein the gas coolant and said second gas are hydrogen.

* * * * *